Sept. 23, 1952 C. P. MOLYNEUX 2,611,352
ELECTROMECHANICAL SPEED GOVERNOR
Filed Jan. 17, 1950
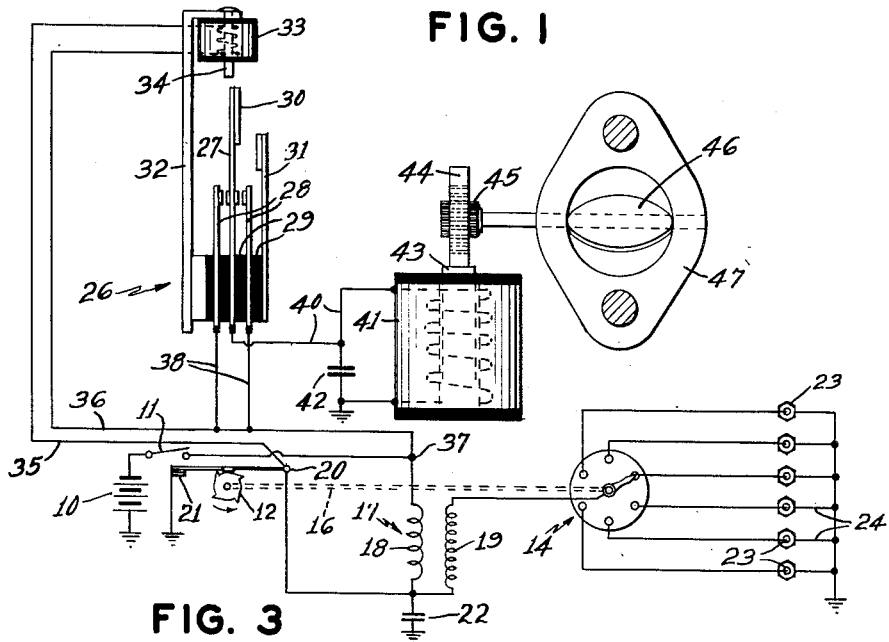
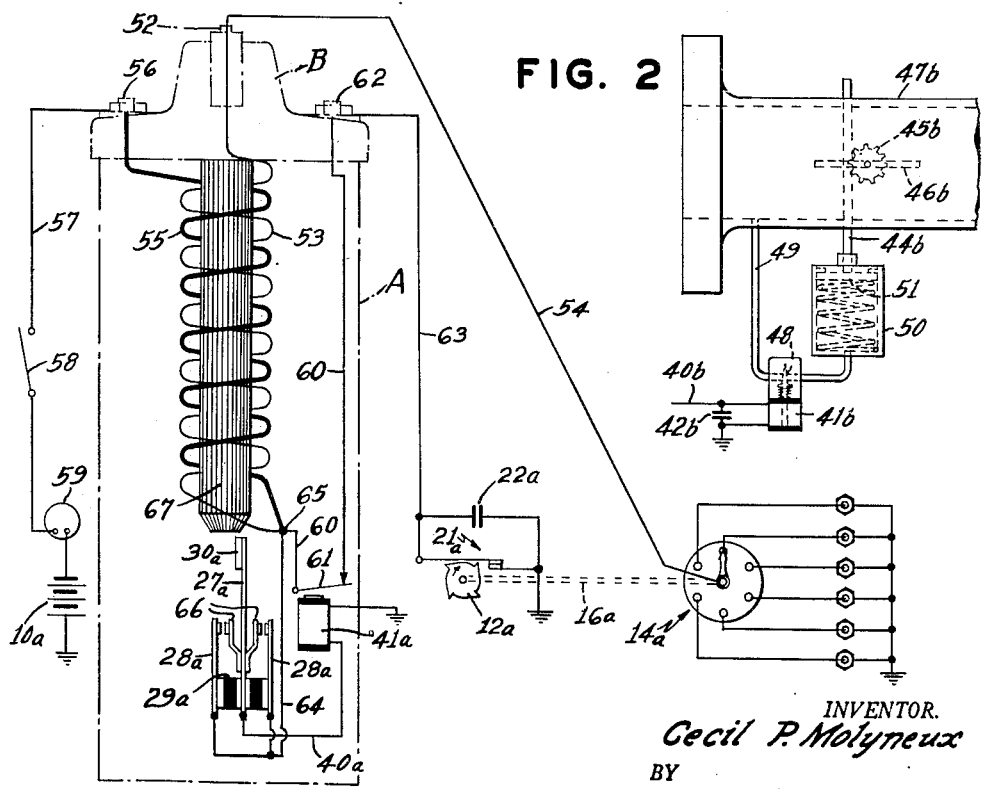
INVENTOR.
Cecil P. Molyneux
BY
Pennie, Edmonds, Morton and Barrows
ATTORNEYS Patented Sept. 23, 1952

2,611,352

UNITED STATES PATENT OFFICE 2,611,352

ELECTROMECHANICAL SPEED GOVERNOR

Cecil Patrick Molyneux, Hampton Bays, N. Y., assignor to Molyneux and Aspinwall, Inc., Long Island City, N. Y., a corporation of New York Application January 17, 1950, Serial No. 139,106

11 Claims. (Cl. 123—102)

My invention relates to improvements in speed governors of the electromechanical type for regulating or limiting the speed of internal combustion engines, motor vehicles and other mechanisms, and for synchronizing the speeds of two or more mechanisms.

My improved speed governor is adapted to overcome the disadvantages involved in the manufacture, installation and use of the present types of governors. For example, the well-known type of fly-ball governor used on engines of various types and on trucks and other vehicles, is expensive to make and requires special structural arrangements for installation. Furthermore, governors of this type are not sufficiently accurate and reliable for present requirements.

The primary object of the present invention is, therefore, to provide an improved apparatus for governing the speed of an engine or other mechanisms which is relatively inexpensive to manufacture, which may be installed in a relatively short time, and which may be readily combined with the standard equipment of an engine or other mechanism to be controlled.

A further object of the invention is to provide an improved governor which will effect a close control of the speed of the engine or other mechanism to be governed or controlled.

Trucks and buses, powered by internal combustion engines, provide a large field in which governors are now used to some extent and in which their use to a greater extent is highly desirable. These and other vehicles and mechanisms driven by internal combustion engines have ignition systems in which a current is created having frequencies proportional to the speed of the engine. According to my invention, I make use of this available relationship, and provide a control unit including a tuned reed having a response frequency set at or corresponding to the desired governing speed, and arranged to actuate means for limiting the speed of the engine.

In accordance with my invention the speed of a mechanism is controlled by subjecting a tuned reed to forces tending to vibrate it at a frequency bearing a selected relation to the speed of the mechanism and utilizing the increased amplitude of movement of the reed when said frequency accords with that of the reed to effect control of the speed of the mechanism. The governor may comprise a unit connected up to actuate a suitable control such as the butterfly valve of an engine, or to open the battery circuit to the ignition coil of the ignition system of an engine.

The governor unit advantageously includes means for eliminating or reducing reed resonance response at sub-multiples of the governing speed. In a preferred construction, the mounting for the tuned reed also carries at least one additional reed which is tuned to the sub-harmonic frequency which would be likely to affect the governing reed, the additional reed being adapted to vibrate at maximum amplitude at this unwanted frequency, and thereby reduce the response of the tuned reed to that frequency.

Additional features of my invention are described in detail hereinafter in connection with illustrative embodiments of governor units associated with the ignition circuits of internal combustion engines. These embodiments are shown in the accompanying drawings forming a part of this application and in which:

Fig. 1 is a broken diagrammatic view of one embodiment of my invention shown in association with a conventional ignition system of an internal combustion engine.

Fig. 2 is a broken diagrammatic view showing a modification of a portion of the governor unit shown in Fig. 1.

Fig. 3 is a view similar to that of Fig. 1 showing a modified form of construction and arrangement.

Referring to Fig. 1 of the drawings, the invention is illustrated in connection with conventional elements of an ignition system of an internal combustion engine. These elements comprise a battery 10, an ignition switch 11, a distributor including a contact breaker 12 and a current distributor 14, the moving elements of which are carried on a shaft 16 driven by the engine, and a spark coil 17 having primary and secondary windings 18 and 19 respectively. The contact breaker 12 includes contacts 21, one of which is actuated by the breaker and the other of which is grounded as shown.

The battery 10, shown grounded in a conventional manner, is connected through the switch 11 to one terminal of the primary winding 18 of the spark coil 17. The other terminal of the winding 18 is connected to the secondary winding 19, to the movable contact of the contact breaker switch 21 at a point 20, and is connected through a condenser 22 to ground. The end of the secondary winding 19, opposite that connected to the winding 18, is connected up for the supply of current to the ignition distributor 14 from which high tension current flows to the six spark plugs 23, of conventional design, having the usual grounded connections shown diagrammatically at 24. The ground connections shown in the drawings are made to the body or frame of the engine as in conventional practice.

The governor mechanism as shown in Fig. 1, comprises a frequency sensing device 26 electrically connected into the ignition circuit described above and to a control actuating means. The device shown generally at 26 includes a tuned metal reed 27 set in a mounting between a pair of similar contact arms 28, all insulated with respect to each other by layers of insulation 29. The reed 27 is provided with a pair of adjacent contacts mounted opposite and normally spaced from respective cooperating contacts on the arms 28. The upper end of the reed 27 is provided with an armature 30. An auxiliary reed 31 having an armature at its upper end and somewhat shorter than the reed 27, is secured to the base assembly in parallel with the reed 27. The reed 31 has a selected tuned frequency which is a sub-harmonic of the frequency of the reed 27.

A metal supporting arm 32 is fastened to the base assembly including the layers of insulation 29 and at its upper end carries an electromagnet 33 having a fixed core 34 which may also be used for securing the electromagnet to the support 32 in a position above the upper ends of the reeds 27 and 31. The electromagnet 33 includes a suitable winding, one terminal of which is electrically connected by a wire 35 to the movable arm of the contact breaker switch 21 at the point 20, and thereby also connected to the lower end of the primary winding 18. The other terminal of the coil of the electromagnet 33 is electrically connected through a wire 36 at a point 37 to the battery current supply line leading through the ignition switch 11. The wire 36 is also electrically connected by wires 38 for the supply of current to the contact arms 28.

The lower end of the metal reed 27 is electrically connected by a wire 40 for the supply of current to a control actuating means, which, in the example as shown in Fig. 1, comprises a solenoid 41. The current outlet of the coil of the solenoid 41 is wired to a ground connection and to the current lead 40 through a suitable condenser 42 which is provided for the purpose of reducing sparking between the contacts of the reed 27 and the contact arms 28.

Solenoid 41 is provided with a movable armature 43 carrying a rack 44 which engages a pinion 45 carried on the shaft of a butterfly valve control 46, arranged in the engine fuel intake line 47. The butterfly valve 46 may be that actuated by the usual engine throttle or a valve separately arranged in the fuel intake of the engine.

The operation of the apparatus shown in Fig. 1 may be described by assuming, for example, that the ignition system is that of an engine having six cylinders represented by the six spark plugs 23. After the ignition switch 11 is closed and the engine started, the contact breaker 12 alternately opens and closes the contact switch 21 at a rate corresponding to the speed of the engine, since the shaft 16 is driven directly by the engine. A pulsating current is therefore produced having a frequency which varies directly with the speed of the engine.

Current flows from the point 37 through the connecting wire 36, the coil of the electromagnet 33 and the wire 35, at the frequency of the switch 21, to actuate the electromagnet at the same frequency. The electromagnet 33 in turn acts upon the reeds 27 and 31, but if the frequency of the electromagnet at a given speed of the engine is not close to that of the tuned frequency of either of the reeds, they will not vibrate appreciably. When, as the engine speed increases, the frequency of the electromagnet 33 reaches that of the tuned reed 31, this reed will vibrate, but, since it is not a control reed, it merely prevents the vibration of the reed 27 at a sub-harmonic of the tuned frequency of the latter.

As the speed of the engine is further increased the frequency of the electromagnet 33 eventually reaches that of the tuned reed 27 so that it is caused to vibrate and thereby effect the closing of the contacts between it and the contact arms 28, thus permitting current to flow through the wires 38 and 40 to energize the solenoid 41. The solenoid 41 in turn actuates the means for moving the butterfly valve 46 toward closed position, thereby preventing operation of the engine above a speed corresponding to the tuned frequency of the reed 27.

The operation of the control apparatus described above in connection with Fig. 1, may be illustrated more specifically in connection with a particular engine speed. Assume, for example, that it is desirable to limit the speed of a six-cylinder, four-cycle automotive engine to 3,000 R. P. M., corresponding, for example, to a particular speed of the automotive vehicle. Since the engine is a four-cycle engine, the contact breaker 12 will actuate the switch 21, once for every two strokes for each cylinder, which, in the case of the six-cylinder engine will be three times per revolution. This value times 3,000 R. P. M. for the engine, gives 9,000 electrical impulses per minute in the electromagnet 33, or 150 impulses per second. If the natural or set frequency of the tuned reed 27 is selected or adjusted to 150 per second, the tuned reed 31 advantageously has a tuned frequency of half that frequency, or 75, so that it would prevent the vibration of the reed 27 at this troublesome sub-harmonic frequency.

The flexible reed 27 in the example referred to, may have a tendency to vibrate to some extent at various sub-harmonic frequencies of its 150 per second, but the auxiliary reed 31, which acts as a mechanical shunt, prevents its vibration to an extent sufficient to close a circuit with the contact arms 28.

It will be understood that the solenoid 41 may be used to actuate any suitable engine control other than the valve 46, as described above. Where the actuating means shown in Fig. 1 is used, the armature 43 in solenoid 41 is advantageously arranged as a close-fitting plunger in the solenoid, so as to obtain dash-pot action, and thereby provide a mechanical time delay means to prevent the reed 27 from passing through its natural frequency by the rapid acceleration of the engine at speeds close to the control speed.

The solenoid 41 may be replaced or supplemented as a motive means by any other suitable control actuator. Such a modified motive means is illustrated in Fig. 2 for actuating a butterfly valve 46b in a fuel intake line 47b. In this apparatus current supplied from the reed 27 upon its vibration at its tuned frequency is conducted through a wire 40b and the winding of a small solenoid 41b, from which the current outlet is grounded, as shown, and connected to the wire 40b through a condenser 42b. In this case, the small solenoid when energized actuates a needle valve 48 which is normally biased to closed position by a spring as shown, the valve being mounted in a suction line 49 leading from the engine intake pipe 47b and connected into a small cylinder 50. A piston 51 in the cylinder 50 and normally biased upwardly by a light spring, as shown, is connected to a rack 44b which meshes with a pinion 45b on the butterfly valve 46b.

When the selected engine speed is reached and vibration of the tuned flexible reed 27 supplies current through the wire 40b, the needle valve 48 is opened, so that the suction in the intake manifold and the fuel supply pipe 47b, is applied in cylinder 50. This suction moves the piston 51 to actuate the butterfly valve 46b toward closed position, thereby reducing the speed of the engine. As the engine speed is reduced the valve 48 returns to its seat and the spring in the cylinder 50 returns the piston and butterfly valve to the normal positions shown. This form of mechanism reduces the current requirements of the governor and provides great torque to move the valve 46b.

The modified form of apparatus shown in Fig. 3 of the drawings is one in which the frequency sensing reed structure is combined directly with an engine ignition coil, and in which the means responsive to the frequency sensing device is arranged to cut off the supply of current to the ignition system of the engine. In Fig. 3, an ignition coil casing A, and its plastic cap B, are shown in dot-and-dash lines. Certain of the elements shown in Fig. 3 of the drawings which are the same as described above in connection with Fig. 1, are referred to by the same numerals, plus the letter a.

The ignition coil casing A encloses primary and secondary windings 55 and 53, and certain parts of the governor. A high tension terminal 52 in the cap B connects the secondary winding 53 through a lead 54 with the ignition distributor 14a. The primary winding 55 is connected through a terminal 56 and a wire 57 to the battery 10a. An ignition switch 58 and an ammeter 59 are included in the connecting wire 57.

In Fig. 3, the lower end of the primary winding 55 is connected to a wire 60 having therein a normally closed switch 61 actuated by the solenoid 41a, the wire 60 being connected through a terminal 62 and a connecting wire 63 with the contact breaker switch 21a. A condenser 22a is arranged in parallel with the switch 21a for reducing sparking between the switch contacts. The contact arms 28a are connected by a wire 64 to the lower end of the primary winding 55 at the point 65, for the supply of current through the contact arms 28a to a pair of oppositely mounted contact arms 66 arranged on the lower portion of the tuned metal reed 27a.

The ignition coil shown in Fig. 3 includes a soft iron core 67 within the windings 53 and 55. This core has a tapered lower end, and the upper end of the tuned flexible reed 27a with its armature 30a is mounted adjacent thereto within the magnetic influence of the iron core.

When the frequency of the magnetic impulses produced in the core 67 by the coil 55 and the contact breaker 12a reaches that of the natural frequency of the tuned reed 27a, the latter will vibrate with sufficient amplitude to close a circuit between the contact arms 66 and 28a, to in turn supply current from the lower end of the reed 27a to the solenoid 41a. The energization of the solenoid 41a opens the switch 61, thereby opening the battery circuit through the ignition coil to the contact breaker and stopping the engine.

The arrangement shown in Fig. 3 may be utilized as an over-speed control adapted to prevent an engine from running away should a governor of any type fail. Assuming, for example, that an internal combustion engine is driving a generator at 1200 R. P. M, and that the reed 27a is tuned to vibrate at a frequency produced by an engine speed of 1275 or 1300 R. P. M., now, if the engine over-speeds sufficiently to reach an R. P. M. of 1275 or 1300, the reed 27a is vibrated to close the contacts of the arms 28a and 66, thereby energizing the relay circuit and opening the battery circuit to the ignition coil.

A standard relay may be employed to provide the solenoid 41a and switch 61, such relay preferably being of the type having normally closed contacts which are opened when the coil of the solenoid is energized. The relay is also advantageously provided with a mechanical lock-out to prevent the cycling of the control system, and with a reset button to restart the engine or other prime mover controlled by the governor.

The governor apparatus shown in Fig. 3 of the drawings advantageously includes means such as an auxiliary reed arranged like the reed 31 in Fig. 1 for enhancing the selectivity and effectiveness of the tuned control reed 27a. Since such a means is shown in Fig. 1, it is not repeated in Fig. 3.

Instead of using an auxiliary reed, other means may be provided for preventing reed resonance response at sub-multiples of the governing speed or frequency. These unwanted frequency responses can be eliminated by making the armatures 30 and 30a of permanent magnetic material or by making the reed itself of such material. In either case the reed is polarized and its response to sub-harmonic frequencies is greatly reduced or eliminated. The response of the tuned reed to sub-harmonic frequencies may also be eliminated by providing an additional winding in the electromagnet 33 which is connected across the battery to provide a steady D. C. magnetizing field which polarizes the electromagnet. While any of these means may be employed, it has been found that the auxiliary reed is a simple and sufficiently effective means for reducing or eliminating the response of the tuned reed 27 or 27a to troublesome sub-harmonic frequencies.

It has been found by experience that the tuned reed-contact arm assembly provides adequate power for energizing the governor actuating means. As the frequency of the field produced by the electromagnet 33, or the equivalent means in Fig. 3, approaches and reaches the frequency of the tuned controlling reed 27 or 27a, the frequency of the vibration of the reed does not change materially, but the length of dwell of the reed contacts on contact arms 28 or 28a, increases because of the bending of the reed, due to its flexibility. This increase in the dwell of the contacts increases the power applied to the control actuating means, such as the solenoid 41, thereby insuring adequate power to operate the control at the selected maximum speed of the mechanism being controlled by the governor.

The apparatus of the present invention may be utilized for limiting the speed of any mechanism which produces a current suitable as a frequency reference, such as means for producing electric impulses at a rate which varies proportionately with the speed of the mechanism. The improved apparatus may be used for controlling the speed of mechanisms which do not include such means where it is possible to provide means for producing electric impulses at a rate proportional to the speed of the mechanism.

Further illustrations of mechanisms which may be governed by the apparatus of the present invention include torpedoes, rockets, jet engines and planes, diesel engines and generators. The fly-ball governors used on torpedoes and jet engines are only accurate to within 10%, so that it is unsafe to set the governor for maximum power. On the other hand, the governor of the present invention will control to within 0.5% of the set value, and if used in place of these fly-ball governors, would increase the available horse power by as much as 140.

Torpedoes, jet engines and the like are usually provided with a small alternator which can be used as a frequency reference source for the governor of the present invention. The connections to the tachometer of such engines may also be used to provide the frequency reference for the governor.

The speed of a diesel engine may be controlled by mounting a small commutator on the flexible shaft between the tachometer and the engine, and using it to produce the frequency reference current to operate the governor of the present invention.

The governor may also be used to put an electric generator in phase with a power line. In this adaptation the actuator of the governor operates a relay to connect the generator with the power line at the instant the generator comes into phase with the power line.

The reeds 27 and 31 are advantageously replaceable in the governor unit so that reeds may be inserted having the desired tuned frequency for the particular maximum speed of any prime mover to be governed.

What I claim is:

1. A speed governor for an internal combustion engine having an electric battery and a contact breaker driven by the engine in circuit with the battery, a tuned reed having a fixed end and a free end adapted to be vibrated at the natural frequency of the reed, an armature mounted on the free end of the reed, electric means adjacent the armature for producing a magnetic field acting on the armature, means including a current lead for supplying current from said circuit of the contact breaker to said electric means at the frequency produced by the contact breaker, a switch associated with the reed and adapted to be closed upon vibration of the reed at its natural frequency, means for supplying current from the battery to one side of said switch, means for reducing the speed of the engine including an electric power means, and a current lead from the other side of said switch to said electric power means.

2. A speed governor as claimed in claim 1 in which the engine includes an ignition current distributor and said speed reducing means comprises an electric relay arranged to cut off the current to the engine distributor when said reed is vibrated at its natural frequency.

3. A speed governor as claimed in claim 1 in which the engine includes an ignition spark coil having a primary winding in circuit between the battery and contact breaker and in which the speed reducing means includes a normally closed switch in the circuit between the primary winding and the contact breaker, said power means being operatively arranged to open said switch in response to the vibration of the reed at its natural frequency.

4. A speed governor for an internal combustion engine having an electric battery, a spark coil, a contact breaker, a distributor and connectors forming an ignition circuit, a tuned reed having a fixed end and a free end adapted to be vibrated at the natural frequency of the reed, an armature mounted on the free end of the reed, the free end of the reed and armature being mounted opposite the end of the core of the spark coil and subject to the magnetic field produced by the frequency of the current flowing through the coil from the battery, a switch associated with the reed and adapted to be closed upon vibration of the reed at its natural frequency, means for supplying current from the battery to one side of said switch, means for reducing the speed of the engine including an electric power means, and a current lead from the other side of said switch to said electric power means, said reed having a natural frequency corresponding to the frequency of said current flowing through the spark coil at the maximum desired engine speed.

5. A speed governor as claimed in claim 4 characterized by including a control means operatively associated with the core of the spark coil for preventing reed resonance response at submultiples of the natural frequency of the reed, whereby actuation of said switch is prevented except when the reed is vibrated at its natural frequency.

6. A frequency responsive control mechanism comprising a tuned reed adapted to be vibrated at a pre-selected frequency, an electrically-operated means operatively associated with the reed for effecting its vibration at its tuned frequency, means for supplying electric current of variable frequency to said electrically-operated means, a normally open electric switch associated with the reed and arranged to be closed by the reed when the reed is vibrated at its tuned frequency, means operatively associated with said electrically-operated means for preventing vibration of the tuned reed at frequencies other than its tuned frequency to an extent sufficient to close said normally open electric switch, means for supplying electric current to one side of said switch, a control circuit including a relay having open and closed positions and biased to one of said positions, and an electrical connection from the other side of said normally open electric switch to said relay for actuating said relay to its other position when said normally open electric switch is closed by the vibration of the reed at its tuned frequency.

7. A frequency-responsive control mechanism as claimed in claim 6, in which said means operatively associated with said electrically-operated means comprises a control means.

8. A frequency-responsive control mechanism as claimed in claim 6, in which said means operatively associated with said electrically-operated means comprises a permanent magnet armature mounted on the free end of the reed.

9. A frequency responsive control mechanism as claimed in claim 6, in which said means operatively associated with said electrically-operated means comprises an auxiliary reed mounted adjacent to the tuned reed, said auxiliary reed having a tuned frequency which is a subharmonic of the frequency of said tuned reed, whereby substantial vibration of said tuned reed in prevented at subharmonic frequencies of its tuned frequency.

10. A speed governor for an internal combustion engine having an ignition system including a spark coil, a contact breaker and a distributor driven by the engine, a source of electric current, and electrical connectors forming an ignition circuit for the system, said governor comprising a tuned reed having a fixed end and a free end, the reed having a predetermined tuned frequency, an armature mounted on the free end of the reed, electric means mounted adjacent the armature on the free end of the reed for producing a magnetic field adapted to act on the armature to vibrate the reed at said frequency, means including electrical connectors for supplying electrical impulses from the circuit of the ignition system to said electric means at the frequency produced by the contact breaker of the ignition system, a normally open switch operatively associated with the reed and adapted to be closed upon vibration of the reed at its tuned frequency during operation of the engine at a predetermined speed, an electrical conductor connected into one side of said switch for conducting electric current thereto, an electrically-operable means for reducing the current supplied to a part of the ignition system when the engine is operated at said predetermined speed to reduce the speed of the engine below said predetermined speed, and an electric conductor connected into the other side of said switch and into said electrically-operable means for effecting its energization, said electrically-operable means being operatively associated with a portion of the ignition circuit of the ignition system and adapted to reduce the current supplied to said part of the ignition system when said reed is vibrated at its tuned frequency, closes said normally-open switch and energizes said electrically-operable means.

11. A speed governor for limiting the speed of an internal combustion engine having an ignition system including a spark coil, a contact breaker and a distributor driven by the engine, a source of electric current, and electrical connectors forming an ignition circuit for the system, said governor comprising a tuned reed having a fixed end and a free end, the reed having a predetermined tuned frequency, an armature mounted on the free end of the reed, electric means mounted adjacent the armature on the free end of the reed for producing a magnetic field adapted to act on the armature to vibrate the reed at said frequency, means including electrical connectors for supplying electrical impulses from the circuit of the ignition system to said electric means at the frequency produced by the contact breaker of the ignition system, a normally- open switch operatively associated with the reed and adapted to be closed upon vibration of the reed at said tuned frequency during operation of the engine at a predetermined speed, an electrical conductor connected into one side of said switch for conducting electric current thereto, a normally-closed electric switch in the portion of the ignition circuit in which the contact breaker is located, the normally-closed switch being in series circuit with the contact breaker, an electrically-operable means for opening said normally-closed switch, and an electric conductor connected into the other side of said normally-open switch and into said electrically-operable means for effecting its energization, said electrically-operable means being adapted to open said normally-closed switch and cut-off the current to the contact breaker when said reed is vibrated at its tuned frequency, closes said normally-open switch and thereby energizes said electrically-operable means.

CECIL PATRICK MOLYNEUX.

REFERENCES CITED

The following references are of record in the file of this patent:

UNITED STATES PATENTS

| Number | Name | Date |
|---|---|---|
| 370,577 | Van Rysselberghe | Sept. 27, 1887 |
| 1,030,050 | Bogen | June 18, 1912 |
| 1,530,176 | Hayes | Mar. 17, 1925 |
| 1,663,890 | Stoller | Mar. 27, 1928 |
| 1,798,922 | Ytterberg | Mar. 31, 1931 |
| 2,169,267 | McCullough | Aug. 15, 1939 |
| 2,220,553 | Van Dijck et al. | Nov. 5, 1940 |
| 2,265,297 | Little | Dec. 9, 1941 |
| 2,518,030 | Kuperus | Aug. 8, 1950 |

FOREIGN PATENTS

| Number | Country | Date |
|---|---|---|
| 261,384 | Great Britain | Oct. 6, 1927 |
| 562,461 | Great Britain | July 3, 1944 |